United States Patent [19]
Pardue et al.

[11] 4,334,778
[45] Jun. 15, 1982

[54] DUAL SURFACE INTERFEROMETER

[75] Inventors: Robert M. Pardue, Knoxville; Richard R. Williams, Oak Ridge, both of Tenn.

[73] Assignee: The United States of America as represented by the United States Department of Energy, Washington, D.C.

[21] Appl. No.: 186,870

[22] Filed: Sep. 12, 1980

[51] Int. Cl.³ .............................................. G01B 9/02
[52] U.S. Cl. .................................... 356/349; 356/351; 356/358
[58] Field of Search ......................... 356/349, 351, 358

[56] References Cited

U.S. PATENT DOCUMENTS 3,788,746  1/1974  Baldwin et al. ..................... 356/349
3,976,379  8/1976  Morokawa .......................... 356/351

OTHER PUBLICATIONS

Bennett, "A Double-Passed Michelson Interferometer", Optics Communications vol. 4, No. 6, pp. 428–430, Mar. 1972.

Primary Examiner—John K. Corbin
Assistant Examiner—Matthew W. Koren
Attorney, Agent, or Firm—David E. Breeden; Stephen D. Hamel; Richard G. Besha

[57] ABSTRACT

A double-pass interferometer is provided which allows direct measurement of relative displacement between opposed surfaces. A conventional plane mirror interferometer may be modified by replacing the beam-measuring path cube-corner reflector with an additional quarter-wave plate. The beam path is altered to extend to an opposed plane mirrored surface and the reflected beam is placed in interference with a retained reference beam split from dual-beam source and retroreflected by a reference cube-corner reflector mounted stationary with the interferometer housing. This permits direct measurement of opposed mirror surfaces by laser interferometry while doubling the resolution as with a conventional double-pass plane mirror laser interferometer system.

3 Claims, 1 Drawing Figure

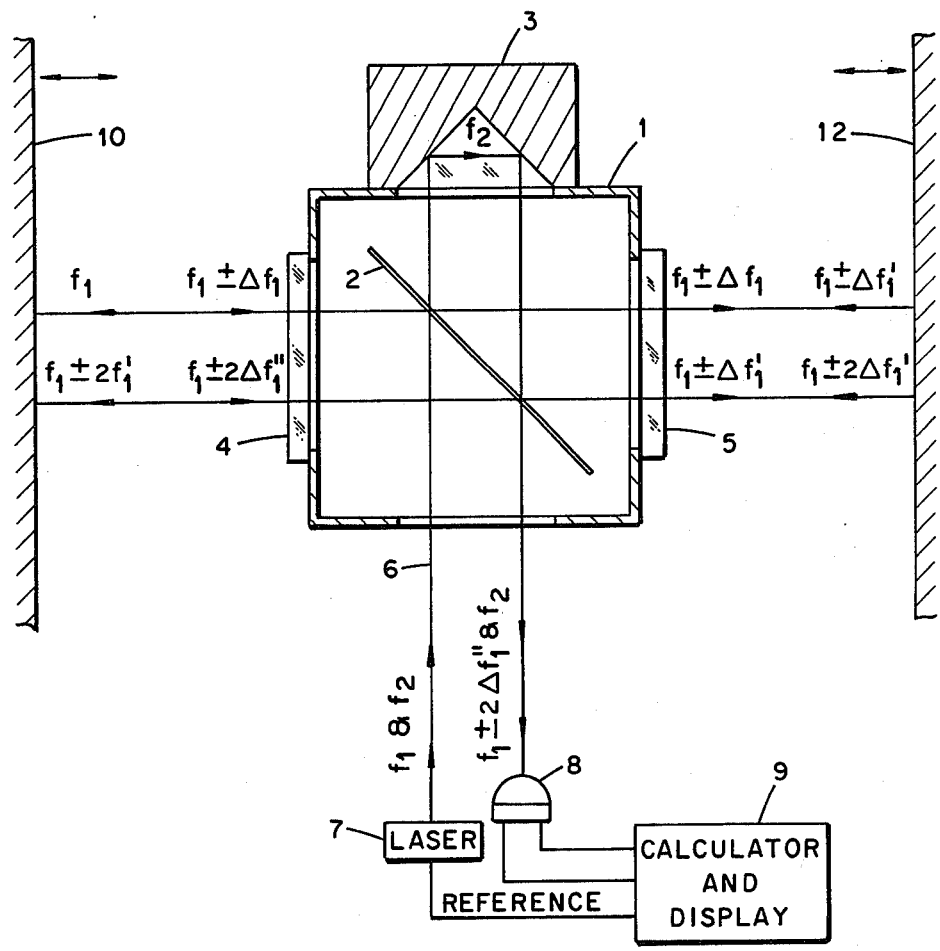

DUAL SURFACE INTERFEROMETER

The invention is a result of a contract with the United States Department of Energy.

BACKGROUND OF THE INVENTION

This invention relates generally to interferometers and more particularly to improvements in plane mirror interferometer systems.

In ultraprecision positioning systems employing laser interferometers, especially in ultraprecision machining utilizing numerical control and employing multiple-axis slides whose position must be monitored very precisely for ultraprecision control, it is common practice to employ a plane mirror, double-pass laser interferometer system to monitor the position of the moving parts of interest. Plane mirror reflector surfaces, as opposed to cube-corner retroreflectors commonly used in linear interferometer systems, offer the advantage of a very high tolerance for angular misalignment of the beam-reflecting plane mirror surface relative to the axis of the beam.

In a typical plane mirror interferometer arrangement utilizing a dual beam technique, a dual frequency beam ($f_1$ and $f_2$) is directed to a remote interferometer housing wherein a polarized beam splitter splits the beam into separate beam paths for frequencies $f_1$ and $f_2$. The beams $f_1$ and $f_2$ are orthogonally polarized so that $f_2$ passes through the beam splitter and strikes a fixed reference cube corner mounted with the interferometer housing. The beam of frequency $f_1$ is reflected at 90° to the entering path through a quarter-wave plate exiting the interferometer housing whereupon it strikes a plane mirror reflector mounted on the object being monitored. The beam is reflected back on itself through the quarter-wave plate causing the polarization of the return frequency to be rotated 90° so that $f_1$ now passes through the polarizing beam splitter striking another cube corner whereupon the frequency $f_1$ is retroreflected to again pass through the beam splitter. The beam $f_1$ is again reflected back upon itself through the quarter-wave plate whereupon its polarization is again rotated 90°. At this point the beam is placed into interference with the beam of frequency $f_2$ at the polarized beam splitter surface and is reflected out of the interferometer housing along with the beam $f_2$ passing through the beam splitter.

This beam made up of frequency $f_2 - f_1 \pm 2\Delta f_1$. The change in frequency $f_1$ is due to a Doppler frequency shift which is above or below $f_1$, depending upon the direction of displacement of the plane mirror surface relative to the interferometer housing. This composite beam is sensed by a measuring photodetector located to view the interference pattern of the resulting composite beam. Relative motion between the plane mirror surface and the interferometer housing along the measuring beam axis causes a difference in the Doppler shifts in the return frequencies, thus creating a difference between the frequency seen by the measuring photodetector and that of a reference photodetector placed to view an interference pattern of the frequencies $f_1$ and $f_2$ emanating from the laser source. This difference is monitored by a subtractor and accumulated in a fringe-count register.

A digital calculator may be used to sample the accumulated value at fixed sampling periods and perform a two-stage multiplication, one for refractive index corrections and the other for conversion to inches or millimeters. The resulting value then updates a display which is programmed to remove the double Doppler effect ($\pm 2\Delta f_1$) to obtain the proper display of the measured displacement relative to $\pm \Delta f_1$. The term "double-pass" refers to the number of times that the beam strikes each surface of interest. For example, with a conventional linear interferometer using a cube corner reflector at the moving surface of interest, the beam from a dual-beam source is split at the surface of a polarizing beam splitter, with one frequency $f_2$ reflected to the reference cube corner mounted in the housing. The other frequency ($f_1$) is transmitted to the measurement retroreflector (cube corner) striking the surface of interest only once. Both frequencies are then placed in interference at the polarizing beam splitter surface and reflected back along a common axis to a photodetector as described above.

By double passing the beam to the plane mirror surface of interest, the beam frequency $f_1$ is changed by twice the relative motion between the interferometer housing and the surface of interest, doubling the resolution of the interferometer since each surface is struck twice. Further, this eliminates errors due to slight tilts of the plane mirror surface relative to the axis of the beam $f_1$.

Although the addition of the above-described plane mirror interferometer with its improved accuracy for XY coordinate positioning of large or poor quality machine slides or tables with relatively inaccurate positioning drives, etc., there remains the problem of direct measurement of relative displacement between two opposed surfaces. The need for this type of measurement is necessary in a number of machining applications as well as various metrology applications. It has been the practice in the art to use an opposed head configuration of interferometers with subsequent subtraction of signals to calculate the relative displacement measurements. Such setups are costly since two complete optical trains are required for each leg of the measurement. A decrease in accuracy also results since in effect two separate, albeit simultaneous, measurements are performed and numerically subtracted. Due to geometry and stiffness, errors can result from deformations and displacement between the two interferometers. In general, careful alignment is required to guarantee that the two interferometers measure along the same line of action or a cosine error will result. Where space is a premium, two measuring legs can be too cumbersome.

SUMMARY OF THE INVENTION

In view of the above need it is a primary object of this invention to provide a laser interferometer system for direct measurement of the relative displacement of opposed plane mirror surfaces.

Another object of this invention is to provide a laser interferometer system as in the above object employing a dual frequency laser source and double pass interferometry techniques to provide improved displacement resolution.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the dual surface interferometer of this invention may comprise a polarized beam splitter disposed between the opposed surfaces at a 45° angle with respect to the path of displacement of the surfaces. A pair of plane mirror converters are disposed on the opposite sides of the beam splitter through which beams transmitted to and reflected from the surfaces from the beam splitter are transmitted and a 90° rotation of the polarization of the beams passing from the surfaces to the splitter is provided. Means are provided for generating and directing a beam of coherent light including two different light beam frequencies ($f_1$ and $f_2$) orthogonally polarized onto a first area of the beam splitter so that the beam $f_1$ is transmitted to and reflected from the opposed surfaces in sequential order along a first beam path perpendicular to the surfaces and passing through the first area of the beam splitter. A retroreflector is disposed in a fixed relationship with respect to the beam splitter to intercept the beam $f_1$ following its first transmission and reflection from each of the surfaces so that the beam $f_1$ is retroreflected onto a second area of the beam splitter. It is then transmitted to and reflected from the opposed surfaces in sequential order a second time along a second beam path parallel to the first beam path and passing through the second area of the beam splitter. The beam $f_2$ passing through the beam splitter is intercepted by the retroreflector and retroreflected onto the second area of the beam splitter to combine in optical interference with the beam $f_1$ following its dual transmission to and reflection from the surfaces along the common exit beam path perpendular to the first and second beam paths. The exit beam includes a Doppler frequency shift of the beam $f_1$ corresponding to relative displacement of the surfaces along the beam axis; and output circuit means including a photodetector disposed to view the exit beam for generating an output in response to Doppler frequency shifts in the beam frequency $f_1$ indicative of the relative displacement of the opposed surfaces. The Doppler frequency shift of the beam frequency $f_1$ corresponds to the direction and velocity of the relative displacement of the opposed surfaces.

The opposed plane mirror surfaces may be provided on parts of a positioning system wherein their relative displacement along a common axis parallel to the beam $f_1$ axis is to be monitored.

BRIEF DESCRIPTION OF THE DRAWING

The accompanying drawing, which is incorporated in and forms a part of the specification, illustrates the present invention and, together with the description, serves to explain the principles of the invention. In the single FIGURE, there is shown in schematic block form a dual surface, plane mirror interferometer system for direct measurement of relative displacement of the plane mirrors made in accordance with the present invention.

DETAILED DESCRIPTION OF THE INVENTION

As shown in the drawing, the dual surface interferometer according to the present invention consists of a conventional interferometer cube body 1 in which is disposed a polarized beam splitter 2 oriented at a 45° angle with respect to the horizontal alignment of the housing cube 1, a retroreflector 3 which may be a conventional cube-corner reflector mounted at the top vertically aligned opening of the cube housing 1 and first and second plane mirror converters 4 and 5 oriented in the horizontal openings of the cube housing 1 through which beam paths exiting and entering the interferometer cube housing 1 pass. The polarized beam splitter 2, which may also be properly referred to in the art as a polarized reflector, when properly oriented with respect to an impinging beam containing separate orthogonally polarized light beams, will totally reflect the one polarization while totally passing the other.

The retroreflector 3 is a component possessing the property of reflecting incident light such that the angle of deviation is substantially equal to 180° for all angles of incidence within its useful field. Either a right angle prism, front surface mirrors disposed in planes with right angles to each other, or a cube-corner prism may be utilized as retroreflectors.

The plane mirror converters 4 and 5 are also of conventional design and may also be properly referred to in the art as quarter-wave plates. The converter causes the polarization of a beam passing through it and returning to be rotated through 90°.

The interferometer cube housing 1 is oriented between two plane mirrored surfaces 10 and 12, as shown in the drawing, so that the plane mirror converters 4 and 5 are parallel to the mirrored surfaces 10 and 12, respectively.

A beam of coherent light 6, composed of two slightly different optical frequencies ($f_1$ and $f_2$) which are orthogonally polarized, is directed onto one area of the beam splitter 2 from an appropriate light source, such as a dual beam laser source 7. The dual beam laser source is preferably a low-power helium-neon laser which is used extensively in interferometer systems. Such a light source is the Model No. 5500C supplied by Hewlett-Packard, Palo Alto, California.

In this arrangement, the laser beam entering the interferometer is split into frequencies $f_1$ and $f_2$. Frequency $f_2$ passes directly through the beam splitter 2 to the cube corner 3, back through the beam splitter 2 and out to a photodetector 8.

Beam $f_1$, which is orthogonally polarized to beam $f_2$, is reflected by the beam splitter 2 through the left plane mirror converter to the left mirror surface 10 and reflected back on itself through the converter 4. The double traversal through the quarter-wave plate 4 rotates the plane of polarization of the $f_1$ beam by 90° so that beam $f_1$ now passes through the beam splitter 2 through the right plane-mirror converter 5 to the right mirror surface 12, whereupon it is reflected back on itself through the converter 5. This again rotates beam $f_1$ by 90° so that it is now reflected by the back side of beam splitter 2 to the cube corner 3 to be retroreflected back to the beam splitter 2 at a second area thereof. It is then reflected a second time through the right converter 5 to the right mirror surface 12, back through the converter 5, through beam splitter 2, through left converter 4 to the left mirror surface 10, reflected back through converter 4. Since its plane of polarization has been rotated by 90°, it is reflected by the beam splitter 2, recombined with beam $f_2$ and transmitted to the photodetector 8.

The difference between the generated beam frequencies, $f_1$ and $f_2$, is about 1.8 MHz for a helium-neon laser source as described above. As in a conventional laser interferometer system, the two basic frequencies $f_1$ and $f_2$ are placed in interference and directed onto a reference photodetector whose output is an AC signal equal to the 1.8 MHz. This provides a reference signal from which changes in the beam frequency returning from the beam splitter 2 due to Doppler frequency shifts detected by the photodetector 8 may be compared in a calculator and display unit 9 to provide an output indicative of the relative displacement between the mirror surfaces 10 and 12. Relative motion between the plane mirror surfaces along the beam $f_1$ axis causes a difference in the Doppler shifts in the return frequencies from each of the surfaces, thus creating a difference between the frequencies seen by the measurement photodetector 8 $(f_1+2\Delta f_1''-f_2)$ and the reference photodetector $(f_1-f_2)$. This difference is monitored by a subtractor and accumulated in a fringe count register at the circuit 9. A digital calculator samples the accumulated value every 5 msec. to convert the accumulated fringe count to inches or millimeters for direct display or read out to a position control system for example.

As described above with respect to the prior art plane mirror interferometer, the Doppler shift of the frequency $f_1$ in the present device is changed by twice the relative motion between the mirror surfaces 10 and 12 due to the fact that the beam is twice transmitted and reflected along separate beam paths from each of the mirror surfaces. This doubles the resolution of the interferometer since each surface is struck twice. Since the two measuring paths are separated and pass through two different areas of the beam splitter 2, any tilting of the mirrored surfaces, within limits of which the light beam can still be reflected to the appropriate areas of the splitter, the tilt is exactly compensated for due to the double passing of the beam $f_1$ to the surfaces.

Thus, it will be seen that a very accurate means of direct measurement of relative displacement between opposed mirror surfaces has been provided by the dual surface interferometer of the present invention. The foregoing description of a preferred embodiment of the invention has been presented for purposes of illustration and description. It is not intended to be exhaustive or to limit the invention to the precise form disclosed and obviously many modifications and variations are possible in light of the above teaching. The embodiment was chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

What is claimed is:

1. An interferometer for measuring relative displacement between opposed parallel plane mirror surfaces along a displacement path perpendicular to said surfaces, comprising:

a polarized beam splitter disposed between said opposed surfaces at a 45° angle with respect to said path of displacement of said surfaces;

a first plane mirror converter disposed between said beam splitter and a first one of said surfaces;

a second plane mirror converter disposed between said beam splitter and the second one of said surfaces;

means for generating and directing a beam of coherent light including two different beam frequencies ($f_1$ and $f_2$) orthogonally polarized onto a first area of said beam splitter so that the beam $f_1$ is transmitted to and reflected from said first and second surfaces sequentially along a first beam path perpendicular to said surfaces, and passing through said first area of said beam splitter; and a retroreflector disposed in a fixed relationship with respect to said beam splitter to intercept said transmitted and reflected beam $f_1$ so that said beam $f_1$ is retroreflected onto said beam splitter at a second area thereof to be further transmitted to and reflected from said first and second surfaces sequentially along a second beam path parallel to said first beam path and passing through said second area of said beam splitter, and said beam $f_2$ passing through said beam splitter is intercepted and retroreflected onto said second area of said beam splitter to combine with said beam $f_1$ following said further transmission and reflection of said beam $f_1$ along a common exit beam path perpendicular to said first and second beam paths, said exit beam including a Doppler frequency shift of said beam $f_1$ corresponding to relative displacement of said surfaces.

2. The interferometer as set forth in claim 1 further including means disposed to view said exit beam for generating an output in response to said Doppler frequency shift indicative of said relative displacement of said surfaces.

3. The interferometer as set forth in claim 2 wherein said means for generating and directing a beam of coherent light includes a helium-neon laser source.

* * * * *